US012559058B2

(12) United States Patent
Rings et al.

(10) Patent No.: US 12,559,058 B2
(45) Date of Patent: Feb. 24, 2026

(54) SEATBELT RETRACTOR HAVING AN ELECTRICALLY ACTUATABLE BLOCKING DEVICE

(71) Applicant: Autoliv Development AB, Vargarda (SE)

(72) Inventors: Philip Rings, Norderstedt (DE); Florian Kunzler, Wedel (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 246 days.

(21) Appl. No.: 18/550,225

(22) PCT Filed: Mar. 14, 2022

(86) PCT No.: PCT/EP2022/056465
§ 371 (c)(1),
(2) Date: Sep. 12, 2023

(87) PCT Pub. No.: WO2022/194743
PCT Pub. Date: Sep. 22, 2022

(65) Prior Publication Data
US 2024/0157909 A1     May 16, 2024

(30) Foreign Application Priority Data
Mar. 18, 2021     (DE) ..................... 10 2021 106 683.2

(51) Int. Cl.
*B60R 22/34*     (2006.01)
*B60R 22/343*     (2006.01)

(52) U.S. Cl.
CPC .................................. *B60R 22/343* (2013.01)

(58) Field of Classification Search
CPC ...... B60R 22/34; B60R 22/341; B60R 22/343
See application file for complete search history.

(56)                References Cited

U.S. PATENT DOCUMENTS 4,723,728 A     2/1988 Kanada et al.
4,895,317 A *   1/1990 Rumpf .................. B60R 22/343
                                                                242/384
(Continued)

FOREIGN PATENT DOCUMENTS

DE            2809395 A1     9/1979
DE            4018214 A1     12/1991
(Continued)

*Primary Examiner* — Sang K Kim
(74) *Attorney, Agent, or Firm* — Dickinson Wright PLLC

(57)                ABSTRACT

A seatbelt retractor having a toothed control disk on a belt shaft and an electrically actuatable blocking device and a blocking lever mounted in a pivot bearing, wherein the electrically actuatable blocking device stops the control disk with respect to the belt shaft and, as a result, the belt shaft is blocked in the pull-out direction, wherein the blocking lever has a lever arm upon which a first spring acts, which spring preloads into position the blocking lever having an arranged blocking tip so that this blocking tip engages in the toothing of the control disk, and an electromagnet that is arranged in the housing, wherein the blocking tip is retracted from the toothing of the control disk, wherein a second spring rests with its blocking arm against the second spring and is loaded by the blocking arm.

11 Claims, 5 Drawing Sheets

(56) References Cited

U.S. PATENT DOCUMENTS

Figure 1:
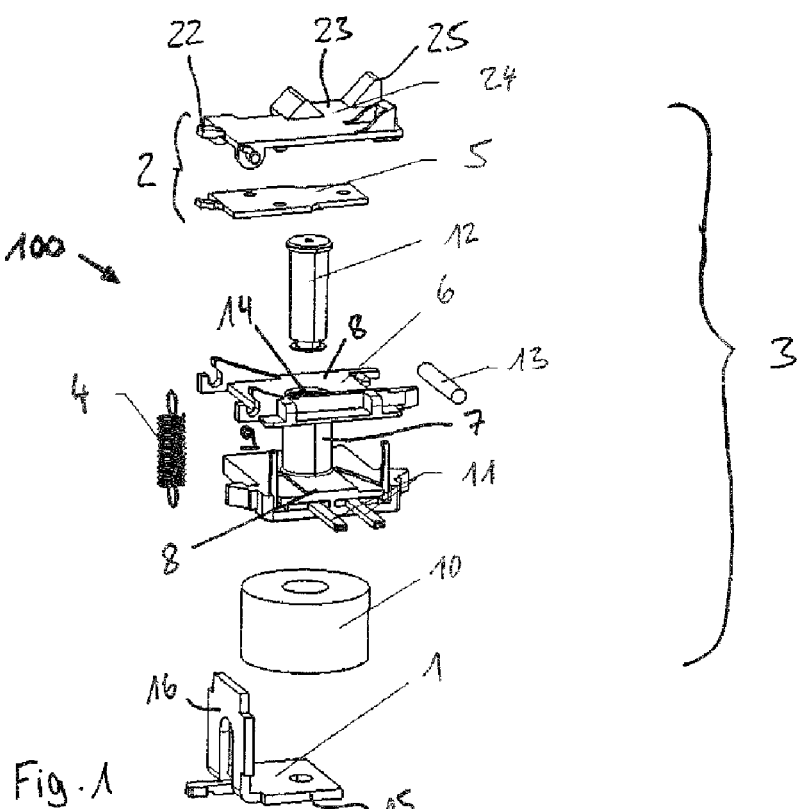

| | | | | | |
|---|---|---|---|---|---|
| 5,538,098 | A | * | 7/1996 | Sparhawk | B60R 22/343 |
| | | | | | 280/806 |
| 5,779,178 | A | * | 7/1998 | McCarty | B60R 22/343 |
| | | | | | 242/384 |
| 12,097,823 | B2 | * | 9/2024 | Glaesser | H01F 7/081 |
| 2022/0332280 | A1 | | 10/2022 | Glaesser et al. | |

FOREIGN PATENT DOCUMENTS

| | | | |
|---|---|---|---|
| DE | 102019213915 | A1 | 3/2021 |
| DE | 102019214388 | A1 | 3/2021 |
| EP | 0460494 | A1 | 12/1991 |
| GB | 2396586 | A | 6/2004 |
| GB | 2398824 | A | 9/2004 |

* cited by examiner

Prior art

Prior art

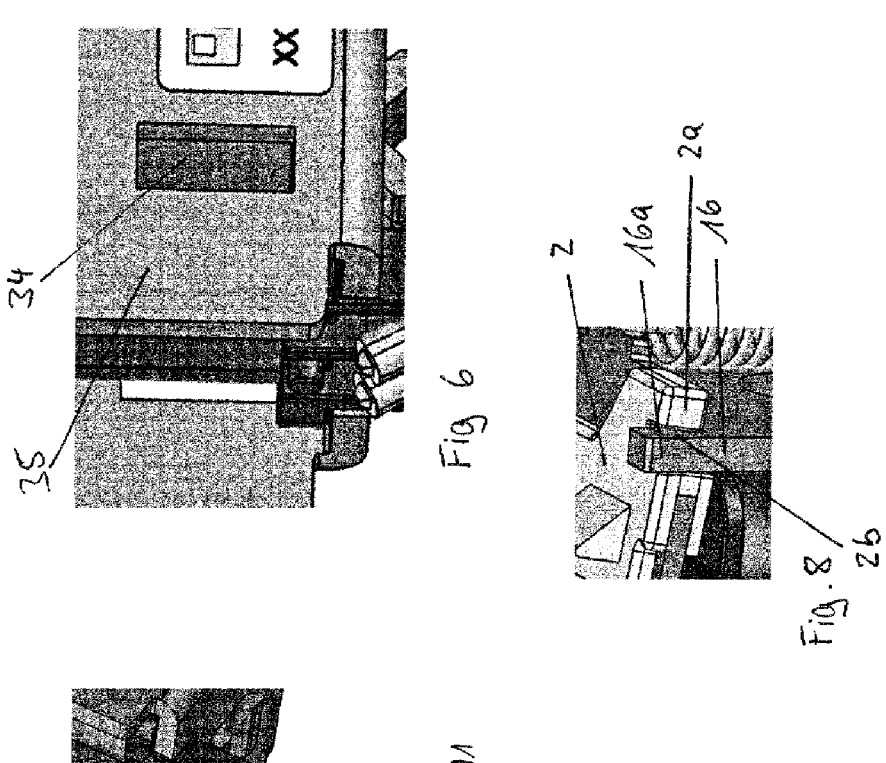
Fig 6
Fig. 8
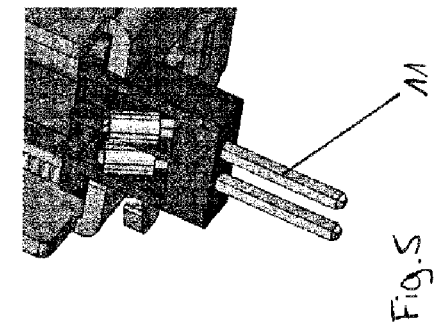
Fig. 5
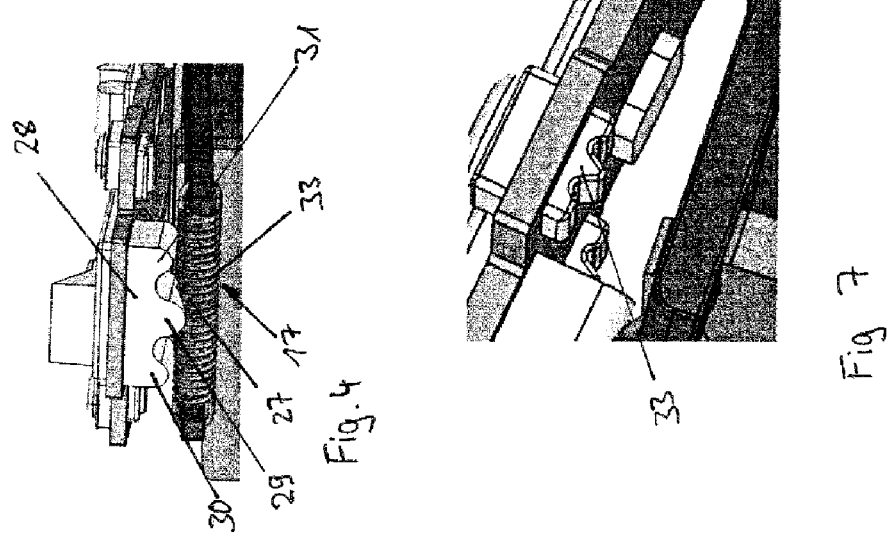
Fig. 4
Fig 7

SEATBELT RETRACTOR HAVING AN ELECTRICALLY ACTUATABLE BLOCKING DEVICE

The present invention relates to a seatbelt having an electrically actuatable blocking device, having the features of the preamble of claim 1.

An electrically actuatable blocking device of the type in question is known, for example, from GB 2 398 824 A.

Such blocking devices are used to stop an externally toothed control disk, which is rotatably mounted on a belt shaft of the seatbelt retractor, with respect to the belt shaft, by engagement of a blocking lever, and as a result to force a blocking pawl to perform a control movement into a toothing fixed to the vehicle, as a result of which, in turn, the belt shaft is blocked in the pull-out direction.

In conventional mechanical blocking devices, an inert mass is mounted on a contact surface which is deflected when a predetermined vehicle deceleration is exceeded, thereby deflecting the blocking lever and forcing it to engage in the toothing of the control disk. Such mechanical blocking devices are also referred to as vehicle-sensitive sensor devices. One problem of these mechanical blocking devices is that the inert mass always has to be aligned in a defined orientation on the contact surface with respect to the vehicle longitudinal axis and the vehicle transverse axis, irrespective of the installation geometry of the seatbelt retractor, in order that the belt shaft is not unintentionally blocked. Thus, the seatbelt retractor must be designed to be individual to the vehicle, in that the orientation of the contact surface and the mass applied thereto, relative to the seatbelt retractor, is individually designed such that it corresponds to the predetermined orientation, taking into account the installation geometry of the seatbelt retractor in the vehicle. Furthermore, in the case of seatbelt retractors integrated in the front seats, such as in the case of convertibles, there is the problem that, when the inclination angle of the backrest is adjusted or when the backrests are folded forward for access to the back seats, the inertial mass is unintentionally deflected to the contact surface and as a result the blocking lever is unintentionally forced into the external toothing of the control disk for a control movement. The seatbelt retractor is thus blocked in the pull-out direction, and the backrest cannot be pivoted further, or the occupant cannot fasten the seatbelt. In order to prevent this, additional disconnection mechanisms or compensation mechanisms must be provided, which, however, may in turn act only in these cases, in order that the restraint of the occupant in the case of an accident is ensured in all cases. As a result of these objects to be achieved, a mechanical blocking device of this kind is mechanically very complex.

In the case of an electrically actuatable blocking device, as is known for example from GB 2 398 824 A, the movement of the blocking lever is, in contrast, electrically controlled, as a result of which the previously required inertial mass is omitted. The seatbelt retractor can thereby be mounted unchanged in different installation positions in the vehicle and also in backrests. Furthermore, the blocking of the belt shaft can be controlled by an electrical signal proceeding from a control device. In this case, the signal can be generated by a control device which can also generate the signal depending on other sensor devices or control systems. For example, it is conceivable to automatically block the belt shaft when a dynamic assistance system is activated, which is controlled for example depending on a signal of an optical sensor device. The electrical blocking device is thus also controlled directly or indirectly, depending on the signal of the optical sensor device. Furthermore, the electrically actuatable blocking device is functional in any orientations and arrangements, since it is not actuated by inertial forces and therefore does not have to be oriented in a specific orientation relative to the vehicle driving direction. Thus, it can preferably also be arranged in seats of at least semi-autonomous vehicles, which the occupant can adjust, for improved communication with the other occupants, for alignment in a rest position, or also generally to make use of the freedom obtained by autonomous driving, in considerably larger adjustment ranges than was possible in the case of seats of conventional non-autonomous vehicles.

Figure 2:
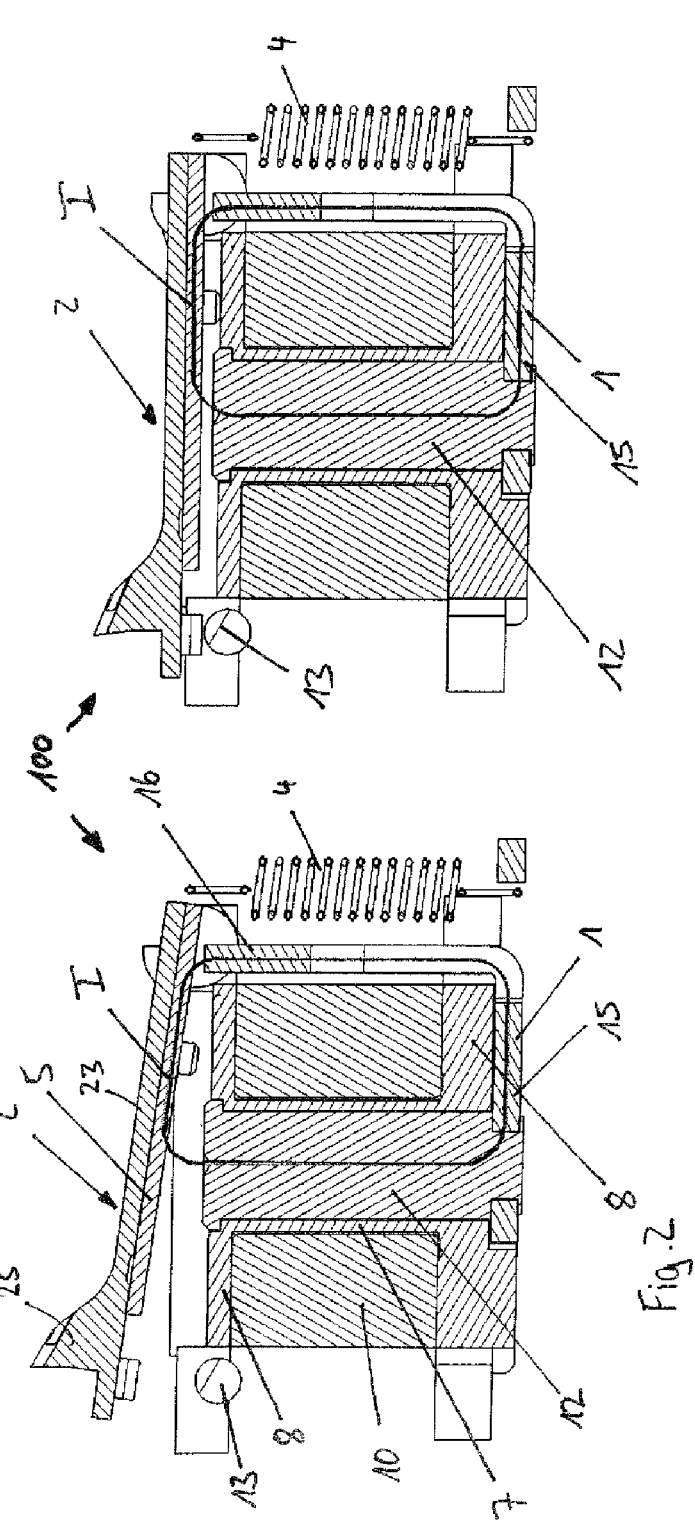

An electrically actuatable blocking device 100 used by the applicant in its products and corresponding to the embodiment of GB 2 398 824 A is shown in FIGS. 1 and 2. The electrically actuatable blocking device 100 comprises, as basic elements, a housing 1 having an L-shaped basic structure comprising a base plate 15 and a first upright limb 16, a blocking lever 2 that is pivotably mounted on the first upright limb 16 of the housing 1, an electromagnet 3, and a first spring 4 which is held by one end on the housing 1 and is connected by the other end to a lever arm 22 of the blocking lever 2 projecting outwards from the first upright limb 16. The first spring 4 is designed as a tension spring, such that it preloads the blocking lever 2 into a position in which it engages with a blocking tip 25 in a toothing 26 of a control disk 21, and thereby holds the control disk 21 back with respect to the belt shaft 20. The control disk 21 comprising the toothing 26 can only be seen in FIG. 9 in a seatbelt retractor according to the invention. In this way, when the belt shaft 20 is rotated in the pull-out direction, the blocking pawl is automatically forced into a toothing fixed to the vehicle, and the belt shaft 20 is subsequently blocked against further pulling out of the seatbelt. The blocking lever 2 comprises a contour part 24 and a steel plate 5, the steel plate 5 facing the electromagnet 3 such that the blocking lever 2 is attracted by the electromagnet 3 when this is energized, and is thus pulled out of the toothing 26 of the control disk 21. As a result, the belt shaft is subsequently freely rotatable in the pull-out and retraction direction. The advantage of this solution is that the belt shaft 20 is blocked in the pull-out direction, even in the event of a power failure or a fault of the electromagnet 3, and the occupant is also reliably restrained in this case.

The electromagnet 3 comprises a base component 6 comprising a column-shaped central portion 7 and two radial flanges 8, one of which in each case projects radially outward at one of the ends of the central portion 7. The electromagnet 3 is held with the base component 6 on the base plate 15 of the housing 1. The base component 6 has a tubular through-portion 14 in the central portion 7 and an annular intermediate space 9 radially on the outside on the central portion 7, the annular intermediate space 9 being limited toward the ends the central portion 7 by the radial flanges 8. Furthermore, the electromagnet 3 comprises a coil 10 having a plurality of windings, which coil is arranged in the annular intermediate space 9 and is electrically contacted with an external control device via lines 11 provided in the base component 6. In addition, the electromagnet 3 comprises a first iron core 12 which is arranged in the tubular through-portion 14 of the base component 6 and a free end of which faces the steel plate 5 of the blocking lever 2.

When the coil 10 is energized, the blocking lever 2 is attracted in that it closes a first magnetic circuit I, which is defined by the first upright limb 16 of the housing 1, the first iron core 12, and the portions of the blocking lever 2 and the base plate 15 between the first iron core 12 and the first upright limb 16, as can be seen in the right-hand view in FIG. 2. Furthermore, a damping element 13 in the form of an inherently supple tube, for example in the form of a short tube piece, is provided, which element is clamped at its ends between two extensions of the radial flange 8 facing the blocking lever 2. The damping element 13 is positioned in such a way that the free end of the blocking lever 2 does not rest against the damping element 13 in the deflected position (left-hand view in FIG. 2), and comes to rest on the central soft portion of the damping element 13 between the clamping points only in the attracted position (right-hand view in FIG. 2). As a result, the attraction movement of the blocking lever 2 is damped in the final phase of the movement. As a result of this damping, a soft stop is implemented, and disruptive "rattling noises" are avoided during the attraction movement and possible subsequent slight movements of the blocking lever 2.

It is an object of the invention to provide a seatbelt retractor comprising an electrically actuatable blocking device that is improved with respect to the blocking operation.

In order to achieve the object, a seatbelt retractor having the features of claim 1 is proposed. Further preferred embodiments of the invention can be gathered from the dependent claims, the figures and the associated description.

According to the basic idea of the invention, it is proposed that a second spring is provided, which is arranged in such a way that the blocking arm of the blocking lever rests against it, irrespective of its position, and said lever is tensioned in the case of a pivoting movement by the blocking arm out of the toothing of the control disk.

The proposed solution has several advantages. A first advantage is that the second spring is tensioned by the pivoting movement of the blocking lever out of the toothing of the control disk, such that the blocking movement of the blocking lever during the pivoting movement into the toothing of the control disk is assisted by the force exerted by the second spring during the relaxation, in addition to the force exerted by the first spring. As a result, the time span required for blocking the control disk, and thus also the time span for blocking the belt shaft, can be reduced, for example to a value of less than 4 ms. Another advantage is that the blocking lever rests against the second spring irrespective of its position, such that, firstly, the movement of the blocking lever is initiated directly and, secondly, undesired rattling noises are prevented permanently and irrespective of the position of the blocking lever. Furthermore, the blocking lever is fixed in position by the permanent abutment on the second spring, irrespective of its position, and disadvantageous movements of the blocking lever can be prevented.

It is furthermore proposed that the second spring supports the blocking lever in the region of the blocking arm, on its side facing away from the control disk. Due to the proposed development, the blocking lever can be acted upon by a pressure force, by a simple support on the second spring. An additional connection of the blocking lever to the second spring can be omitted as a result. Furthermore, the blocking lever preferably rests with the blocking arm on the second spring, so that the blocking lever is acted upon on two sides, at two mutually spaced locations on either side of its pivot bearing, by means of the lever arm, with a tensile force, and with a compressive force via the blocking arm.

It is furthermore proposed that the second spring is fixed by a first and a second end, and the blocking lever rests, with the blocking arm, against a spring portion of the second spring that is arranged between the first and the second end of the spring. The second spring is fixed in relation to the blocking lever, in the form of an abutment, by being fixed by its two ends on the blocking device, and, together with the spring portion provided between the two fixed ends, simultaneously forms a resilient contact surface for the blocking lever. In this case, the two ends of the second spring are fixed to the blocking device in a tensile resistant manner, such that they are tensioned in the region of the spring portion during the attraction movement of the blocking lever, and the clamping force generated in the spring in the process is absorbed by the blocking device via the two fixed ends.

Furthermore, the blocking arm can preferably have a profile structure adapted to the surface of the spring, on the surface provided for contact on the second spring. The contact surface between the blocking lever and the second spring can be increased by this adapted profile or surface structure. In this case, this adapted profile structure can be shaped such that it is adapted to the shape of the second spring in the tensioned state and/or also in the relaxed state. In this case, the shaping of the surface of the blocking lever in the direction of the longitudinal direction of the second spring and in the transverse direction of the second spring are available for shaping the surface structure. In this case, the profile structure can be realized, for example, in the form of one or two purposely designed curvatures in the surface of the blocking lever, i.e. purposely designed to be uneven.

It has been found that the profile structure can preferably be formed by a plurality of cams of different heights, the cam of the greatest height being arranged centrally, and the cams of lower height being arranged laterally and symmetrically with respect to the central cam of the greatest height. As a result of the shaping of the proposed profile structure, the contact surface of the blocking lever is increased continuously, during the clamping of the second spring, from an initially smaller contact surface to a larger contact surface, so that the tensioning of the spring can be realized with an increasing spring force, which in turn also results in an increase in the braking force acting on the blocking lever.

Furthermore, the surface of the second spring can have a structure consisting of a plurality of grooves extending perpendicularly to the pivot axis of the blocking lever. The proposed profiling has the advantage that the blocking lever is secured by the grooves in an improved manner against lateral displacement relative to the second spring.

It is further proposed that the second spring is formed by a coil spring. Coil springs can be produced very cost-effectively in mass production, and can be procured and installed as finished parts. In this case, they also have the advantage that, due to the windings, they already have a profiled surface structure having grooves, which can be used for laterally fixing the blocking lever in position, as described above.

It is further proposed that the second spring is arranged at an angle of 5 to 15 degrees with respect to the pivot axis of the blocking lever, as a result of which the length of the second spring is extended, at an identical installation space width, and the spring behavior can thus be improved. If a coil spring is provided, the pitch of the windings can additionally be compensated by the proposed arrangement, in that the coil spring is arranged at the same angle, in a corresponding manner, opposite to the pitch of the windings. The second spring can thus be arranged such that the grooves between the windings are arranged perpendicularly to the pivot axis of the blocking lever.

It is further proposed that an impact damper, limiting the pivoting movement of the blocking lever, is provided on the blocking lever and/or a fixed counter surface of the blocking device. The movement of the blocking lever in the end phase can additionally be damped by the impact damper. In this case, a possible noise development in the event of contact of the blocking lever, despite resting on the second spring, can additionally be reduced by the damping properties of the impact damper. For this purpose, the impact damper can be formed, for example, from a plastics material having a low hardness, or from an elastomer.

In this case, a particularly favorable design of the electromagnet can be implemented in that the electromagnet has a coil comprising a through-opening, and an iron core is arranged in the electromagnet, which core exerts a magnetic force on the blocking lever via the steel plate when a voltage is applied to the coil, and actuates said blocking lever counter to the force of the first spring in order to trigger a blocking or deblocking movement.

It is furthermore proposed in this case that the movement of the blocking lever is forced at least by a first magnetic circuit which is formed by the first iron core, the upright first limb, and the portions of the base plate and of the blocking lever between the first iron core and the upright first limb.

Figure 3:
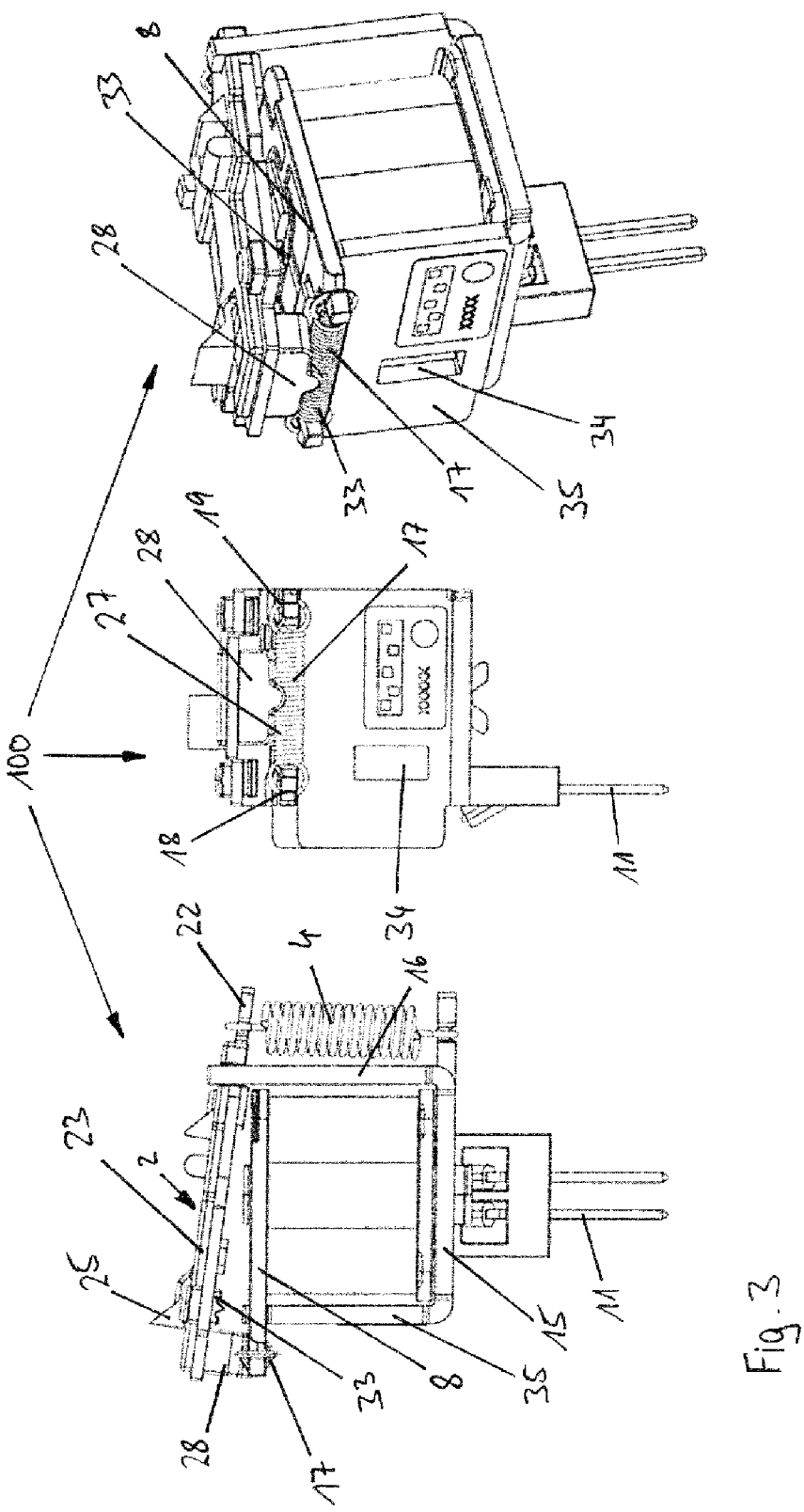
Figure 9:
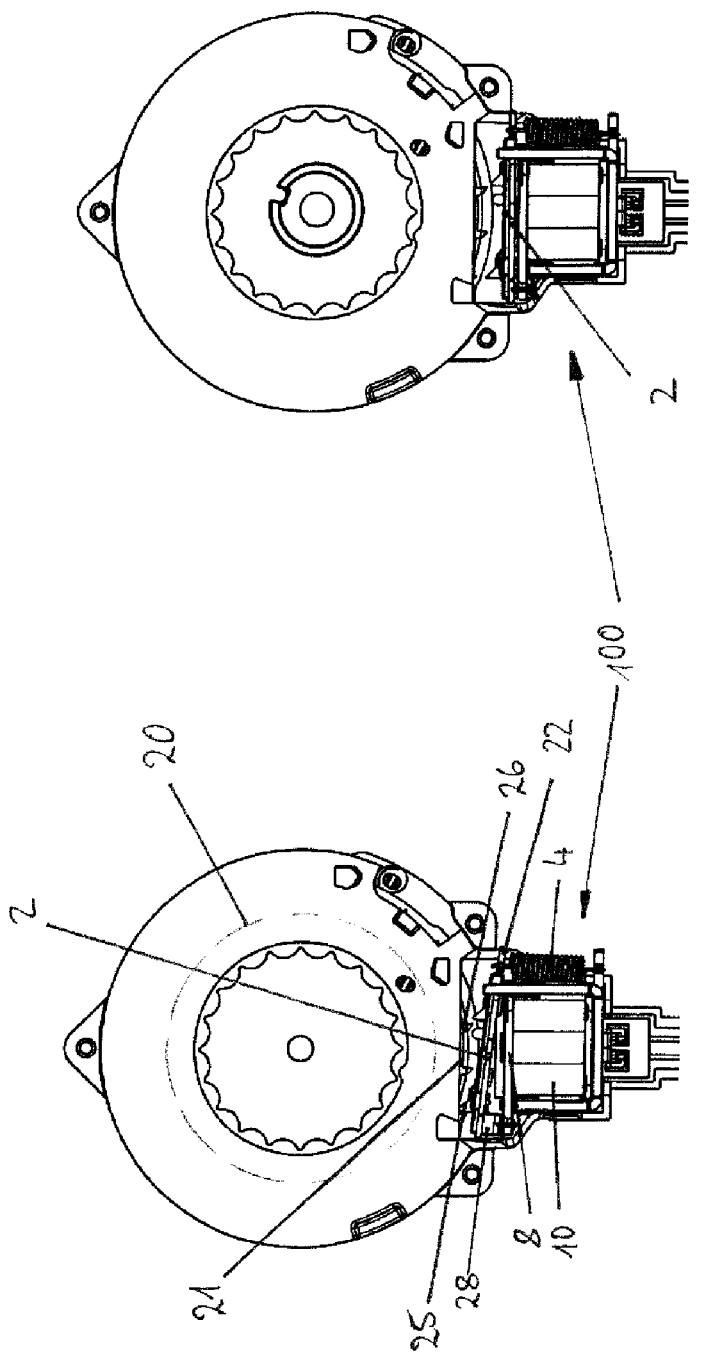

The invention is explained below on the basis of preferred embodiments, with reference to the accompanying figures, in which:

FIG. 1 is an exploded view of an electrically actuatable blocking device according to the prior art; and FIG. 2 is a sectional view of an electrically actuatable blocking device according to the prior art, having a blocking lever in two different positions; and FIG. 3 shows a developed electrically actuatable blocking device in different views; and FIGS. 4 to 8 show different enlarged details of the developed electrically actuatable blocking device; and FIG. 9 shows side view of a seatbelt retractor according to the invention comprising a developed blocking device having a blocking lever in two different positions.

FIG. 3 shows a developed electrically actuatable blocking device 100 according to the invention, which is notionally used in the seatbelt retractor known in the prior art and replaces the blocking device 100 there in FIGS. 1 and 2. The developed blocking device 100 corresponds in its basic structure to the blocking device 100 described with reference to FIGS. 1 and 2 and known in the prior art, so that in this regard reference is made to the description in the introduction to the description, and only the structural features of the developed blocking device 100 differing therefrom, and the advantages resulting therefrom, are described below.

FIG. 3 shows the developed blocking device 100 in a position having a deflected blocking lever 2, which corresponds to the position of the blocking device 100 which is to be seen in the left-hand illustration of FIG. 2. In the left-hand illustration of FIG. 9, the same developed blocking device 100 can be seen on a seatbelt retractor according to the invention comprising a deflected blocking lever 2, while the same blocking device 100 comprising a non-deflected blocking lever 2 not deflected can be seen in the right-hand illustration. In the blocking position, the blocking lever 2 engages with a blocking tip 25 in the toothing 26 of the control disk 21, as a result of which the control disk 21 is blocked with respect to the belt shaft 20, so that the blocking pawl is forced to block the belt shaft 20 in the pull-out direction for the control movement into the toothing of the seatbelt retractor which is fixed to the vehicle. The belt shaft 20 is then blocked in the pull-out direction of the seatbelt wound thereon.

Instead of the previously provided damping element 13 (see FIGS. 1 and 2), a second spring 17 is now provided, which is held by its two ends 18 and 19 on opposite extensions of the radial flange 8 facing the blocking lever 2. The second spring 17 is designed as a coil spring having a plurality of windings, and grooves 33 arranged between said windings on the surface, and has a spring portion 27 provided between the two ends. The second spring 17 is arranged such that it supports the blocking lever 2 with the spring portion 27 on a profile structure 28 provided on the underside of the blocking arm 23. The blocking lever 2 thus also rests on the second spring 17 in the deflected position and uses it as a resilient abutment, such that it is also fixed in position in the deflected position, that is to say is secured against unintentional pivoting out of the toothing due to the spring force exerted by the second spring 17. The second spring 17 is arranged here at an angle of 5 to 15 degrees to the pivot axis of the blocking lever 2, i.e. slightly diagonally relative thereto, as a result of which the spring length can be increased with the same installation width. In addition, in the case of an orientation of the second spring 17 counter to the pitch of the windings of the coil spring, the pitch of the windings can be compensated, so that the grooves 32 between the windings are oriented perpendicularly to the pivot axis of the blocking lever. Here, the windings having the grooves 33 formed between them form a surface structure which secures the blocking lever 2 against lateral slippage relative to the second spring 17. If the second spring 17 is not designed as a coil spring, for example as a leaf spring, this surface structure can also be formed in the form of depressions in the second spring 17. The second spring 17 is preferably made of metal, so that it is less temperature-dependent in terms of its properties, and is more resistant to aging, compared to the use of a plastics spring.

Furthermore, a second upright limb 35, which is opposite the first limb 16, is provided on the base plate 15, in addition to the first upright limb 16, via which second limb a second magnetic circuit can be closed for increasing the attractive force of the electromagnet 3. In addition, the second limb 35 can also serve to support the upper radial flange 8 or alternatively to hold the second spring 17. However, the mounting of the second spring 17 on the radial flange 8 of the electromagnet 3 is advantageous in that it is arranged in this case on the part which exerts the attractive force on the blocking lever 2 when the electromagnet 3 is energized, so that the movement of the blocking lever 2 when the electromagnet 3 is energized is directly cushioned.

A slot 34 for fastening the blocking device 100 to the seatbelt retractor, in particular on a housing of the seatbelt retractor, is provided in the second limb 35, as can also be seen in the enlarged illustration of FIG. 6. An identical slot 34 can additionally also be provided in the first upright limb 16, so that the blocking device 100 can also be held on both sides.

Furthermore, an impact damper 33 is provided on the underside of the blocking lever 2, on the side of the steel plate 5 facing the radial flange 8. The lines 11 are designed here as contact pins which are guided vertically downwards, in the form of dimensionally stable metal pins, as can also be seen in FIG. 5.

If the electromagnet 3 is energized, the blocking lever 2 is then attracted by the magnetic force exerted by the electromagnet 3 on the steel plate 5, and thereby pivots with its blocking tip 25 out of the toothing 26 of the control disk 21. As a result, the control disk 21 is released and, due to its spring load, rotates back, relative to the belt shaft 20, by a small rotational angle, and thereby pulls the blocking pawl out of the toothing fixed to the vehicle, so that the belt shaft 20 can subsequently rotate freely in the pull-out and retraction direction. At the same time, the first spring 4 and the second spring 17 are tensioned by the attraction movement of the blocking lever 2. In this case, the blocking lever 2 clamps the first spring 4 via the lever arm 22, while exerting a tensile force. At the same time, the blocking lever 2 exerts a pressure force on the second spring 17, resting on its underside, by means of the blocking arm 23, whereby this is deformed in an arc-shaped manner in the direction of the base plate 15. The blocking arm 23 of the blocking lever 2 has, on its underside, a profile structure 28 consisting of three cams 29, 30 and 31, which are of different heights, as can be seen in FIG. 4. The cam 29 of the greatest height is arranged centrally between the two cams 30 and 31 of the lower identical heights. Furthermore, the two cams 30 and 31 of the lower identical heights are arranged symmetrically with respect to the central cam 29 of the greater height, i.e. at an identical distance therefrom. Thus, during the attraction movement of the blocking lever 2, the second spring 17 is first tensioned by means of the central cam 29, and the two cams 30 and 31 of the lower height come to rest on the second spring 17 only later, and preferably simultaneously. In this way, the second spring 17 is tensioned successively by means of the cams 29, 30, 31, and the tightening movement of the blocking lever 2 is decelerated to its end by a rising spring force. The cams 29, 30, 31 thus form a surface adapted to the curvature of the tensioned second spring 17, in the connection of the highest points or lines of their end faces. Of course, the cams 29, 30, 31 can additionally also have a surface which is concavely curved in its longitudinal extension and which is adapted to the curvature of the second spring 17 in its cross section, so that the cams 29, 30, 31 rest against the second spring 17 over a larger area of the periphery.

Furthermore, an impact damper 33 is provided on the underside of the blocking arm 23 of the blocking lever 2, which impact damper faces in the direction of the upper side of the radial flange 8 of the electromagnet 3 and prevents the blocking lever 2 from coming into contact with the radial flange 8 directly with its steel plate 5, even under the most unfavorable circumstances, as can be seen in FIG. 7. The impact damper 33 has a tip by which it first comes to rest on the surface of the radial flange 8, and which, due to its shape, causes increasing damping of the blocking lever 2 during the attraction movement. The impact damper 33 can be formed, for example, from a low-hardness plastics material, by an elastomer, or the like.

FIG. 8 shows the mounting of the blocking lever 2 on the upright first limb 16. The blocking lever 2 is provided with a protruding arm to the side, forming an intermediate space 2b. The first limb 16 is provided with an arm 16a protruding upwards from it, which engages in the intermediate space 2b. The blocking lever 2 is thus mounted in the lateral direction with respect to the upright limb 16. Furthermore, the intermediate space 2b simultaneously forms a stop for limiting the movement of the blocking lever 2 in the direction of the upright limb 16.

The second spring 17 is arranged obliquely at an angle that is not equal to 90 degrees with respect to the longitudinal axis of the blocking lever 2, preferably at an angle of from 5 to 15 degrees with respect to the pivot axis of the blocking lever 2, so that with the same width of the blocking device 100 a longer second spring 17 having a correspondingly softer spring characteristic can be used. If the second spring 17 is designed as a coil spring, the pitch of the windings can be compensated by the arrangement of the second spring 17 to such an extent that the grooves 33 are oriented approximately perpendicularly to the pivot axis of the blocking lever 2. As a result, the blocking lever 2 has an improved hold on the spring 17 by means of the profile structure 28, and is secured in an improved manner against lateral slippage, on the second spring 17.

In addition to the cushioning of the attraction movement, the advantage of the second spring 17 can additionally be considered that of the second spring 17 supporting the blocking movement of the blocking lever 2 in the tensioned position, when the electromagnet 3 is deactivated, and, in addition to the first spring 4, additionally forces the blocking lever 2 into the toothing 26 of the control disk 21. As a result, the time span for the blocking of the control disk 21, and thus the blocking of the belt shaft 20, in the pull-out direction can be shortened. The blocking lever 2 is thus driven both by the tensile force exerted by the first spring 4 and by the compressive force exerted by the second spring 17, relative to the pivoting movement required for the locking.

Overall, the movement of the blocking lever 2 can be implemented with substantially lower natural movements and thus in a substantially more controlled manner, by the provided second spring 17 and the pressure force exerted via said spring, both during the attraction movement towards the blocking device 100 and during the locking movement into the toothing 26 of the control disk 21, than was possible in the solution previously known in the prior art comprising just one first spring 4. In particular, due to the provided second spring 17, the blocking lever 2 is caused to perform the pivoting movement from two sides, during the locking movement, the torques exerted on the blocking lever 2 by the first spring 4 and by the second spring 17 being added to one another. A further advantage of the invention is to be considered that the blocking lever 2 is also still caused to perform the locking movement when the first spring 4 exerts no or only a lower spring force on the blocking lever 2 for any reasons, in that the blocking lever 2 is then caused to perform the locking movement, by means of the second spring 17.

The invention claimed is:

1. A seatbelt retractor comprising:
a rotatably mounted belt shaft having a blocking pawl moveably connected thereto;
a control disk rotatably mounted on the belt shaft, the control disk having toothing; and
an electrically actuatable blocking device comprising,
a housing having a base plate and an upright first limb, and
a blocking lever which is pivotably mounted in a pivot bearing of the upright first limb and comprises a steel plate, wherein
the electrically actuatable blocking device stopping the control disk with respect to the belt shaft, by way of an engagement of the blocking lever in the toothing, and as a result forcing the blocking pawl to perform a movement in which it comes into engagement in a toothing of the seatbelt retractor that is fixed to the vehicle, and blocking the belt shaft in the pull-out direction,
the blocking lever having a lever arm that projects outward from the first limb and on which a first spring acts, which preloads the blocking lever into a position in which it engages, with a blocking tip arranged at the end of a blocking arm, in the toothing of the control disk, and
an electromagnet arranged in the housing, which exerts a force on the blocking lever by energization, by means of which force said blocking lever is pulled out of the toothing of the control disk together with the blocking tip, wherein a second spring is provided, which is arranged in such a way that the blocking lever rests against it irrespective of its position, with its blocking arm, and is tensioned by the blocking arm during a pivoting movement from the toothing of the control disk.

2. The seatbelt retractor according to claim 1, wherein the second spring supports the blocking lever in the region of the blocking arm, on its side facing away from the control disk.

3. The seatbelt retractor according to claim 1, wherein the second spring is fixed with a first and a second end, and the blocking lever bears, with the blocking arm, against a spring portion of the second spring, said spring portion being arranged between the first and the second end of the second spring.

4. The seatbelt retractor according to claim 1, wherein the blocking arm has, on the surface provided for bearing against the second spring, a profile structure adapted to the surface of the second spring.

5. The seatbelt retractor according to claim 4, wherein the profile structure is formed by a plurality of cams of different heights, the cam of the greatest height being arranged centrally, and the cams of the lower height being arranged laterally and symmetrically with respect to the central cam of the greatest height.

6. The seatbelt retractor according to claim 4, wherein the surface of the second spring has a structure consisting of a plurality of grooves extending perpendicularly to the pivot axis of the blocking lever.

7. The seatbelt according to claim 1, wherein the second spring is formed by a coil spring.

8. The seatbelt retractor according to claim 1, wherein the second spring is arranged at an angle of 5 to 15 degrees relative to the pivot axis of the blocking lever.

9. The seatbelt retractor according to claim 1, wherein an impact absorber that limits the pivoting movement of the blocking lever is provided on the blocking lever and/or a fixed counter-surface of the blocking device.

10. The seatbelt retractor according to claim 1, wherein the electromagnet comprises a coil having a through-opening, and an iron core is arranged in the through-opening, which core exerts a magnetic force on the blocking lever via the steel plate when a voltage is applied to the coil, and actuates the blocking lever counter to the force of the first spring in order to trigger a blocking or deblocking movement.

11. The seatbelt retractor according to claim 10, wherein the movement of the blocking lever is forced at least by a first magnetic circuit which is formed by the first iron core, the upright first limb, and the portions of the base plate and of the blocking lever between the first iron core and the upright first limb.

\*   \*   \*   \*   \*